United States Patent [19]

Northcutt

[11] 3,755,902
[45] Sept. 4, 1973

[54] TOOL FOR REMOVING AN ORTHODONTIC ONLAY THAT HAS BEEN CEMENTED TO THE FRONT SURFACE OF A TOOTH

[76] Inventor: Michael E. Northcutt, 12720 Dianne Dr., Los Altos Hills, Calif. 94021

[22] Filed: July 31, 1972

[21] Appl. No.: 276,716

[52] U.S. Cl. .................................................. 32/66
[51] Int. Cl. ............................................. A61c 7/00
[58] Field of Search .................. 32/66, 45, 14, 40 R

[56] References Cited
UNITED STATES PATENTS
2,985,962   5/1961   Shiner ................................... 32/66
701,616   6/1902   Reynolds ............................... 32/45

*Primary Examiner*—Robert Peshock
*Attorney*—William E. Schuyler, Dale H. Hoscheit et al.

[57] ABSTRACT

A tool for removing an orthodontic onlay or bracket from a tooth to which it has been cemented. The tool comprises pliers, having a pair of pivoted jaws and handles. One of the jaws has a raised pad having a resilient surface that is placed against the edge of the tooth, and the other jaw has a hard metal insert shaped to provide a chisel portion with a sharp edge for getting in between the tooth and the onlay. When the handles are forced together, the jaws move toward each other and the chisel portion separates the onlay or bracket from the tooth.

4 Claims, 4 Drawing Figures

Patented Sept. 4, 1973 3,755,902
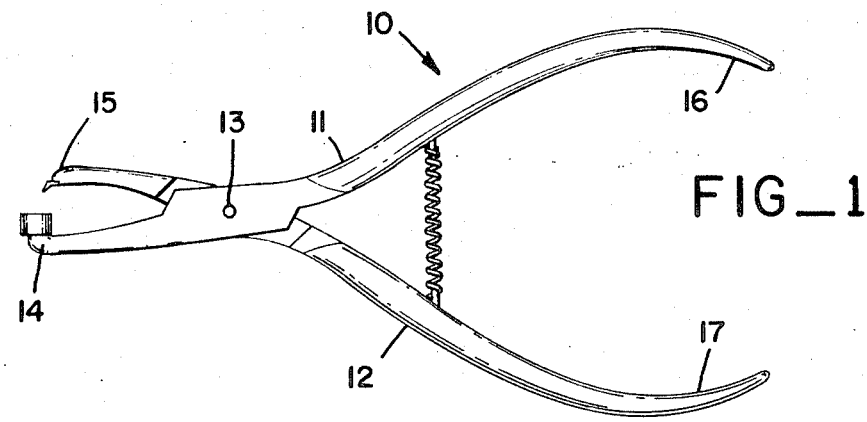
FIG_1
FIG_2
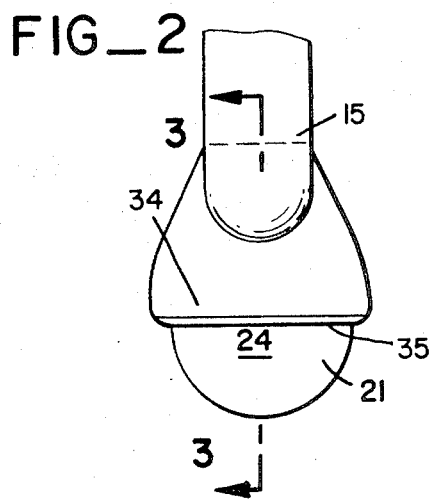
FIG_3
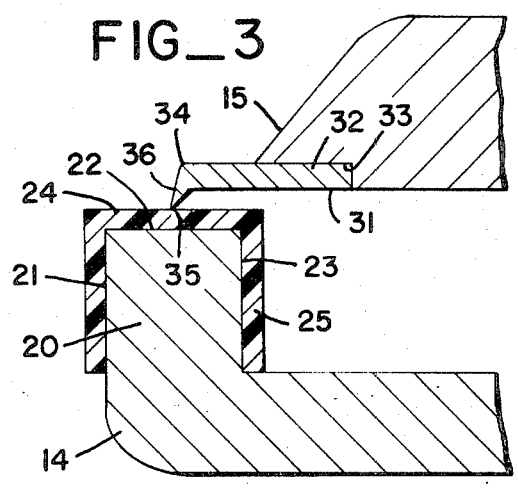
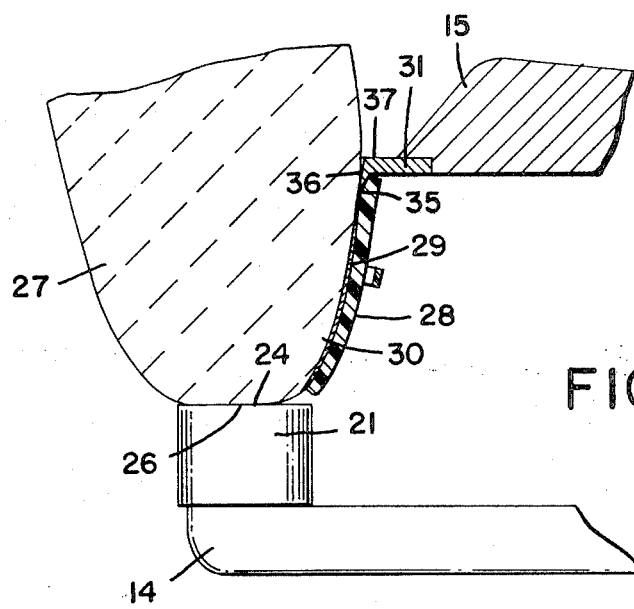
FIG_4

TOOL FOR REMOVING AN ORTHODONTIC ONLAY THAT HAS BEEN CEMENTED TO THE FRONT SURFACE OF A TOOTH

BACKGROUND OF THE INVENTION

The use of onlays cemented to a tooth is new. One problem presented by such orthodontic appliances is that not only must the onlay be cemented to the tooth but that eventually it must be removed from it. There is no tool known which can accomplish this function efficiently.

SUMMARY OF THE INVENTION

The invention comprises a pliers having a pair of pivoted jaws and a pair of handles. One of the jaws has a raised pad with a resilient surface, and this jaw is placed against the edge of the tooth to prevent chipping or fracturing of the tooth. The other jaw has an insert of hard metal which is shaped to provide a chisel portion with a sharp edge and a forward chisel surface that is shaped concavely to approximate the surface matching the tooth. It projects toward the pad and in use rests against the pad when the jaws have been fully closed together. During use, the pad is seated on the edge of the tooth and the sharp member is located just above the dental onlay and then is moved down in between the onlay and the tooth where the cement is. The forcing together of the handles forces the jaws to move together, and as the jaws move toward each other the chisel-like tool scrapes the onlay from the tooth.

Other objects and advantages of the invention will appear from the following description of a preferred embodiment.

In the drawings:

FIG. 1 is a view in side elevation of a dental onlay removal tool embodying the principles of the invention.

FIG. 2 is an enlarged fragmentary view of the two jaws in the position where they are closed against each other.

FIG. 3 is a view in section taken along the line 3—3 in FIG. 2.

FIG. 4 is a view similar to FIG. 3 but with the tool being used to remove an onlay from the tooth just at the commencement of the removal operation.

DESCRIPTION OF A PREFERRED EMBODIMENT

A tool 10 embodying the principles of the invention is shown in FIG. 1. It comprises two members 11 and 12 which cooperate with a pivot 13 to provide a pair of pivoted jaws 14 and 15 and a pair of handles 16 and 17. Movement of the handles 16 and 17 toward each other causes the jaws 14 and 15 to move toward each other, and movement of the handles 16 and 17 away from each other opens the jaws 14 and 15. If desired, a spring 18 may be used between the handles 16 and 17 to urge them apart normally, the spring 18 being held in place by projections or posts 19 and 19a on the handles 16 and 11.

The jaw 14 has an upstanding portion 20 (see FIG. 3) which is preferably round and is provided with a pad 21 which rests on its upper surface 22 and covers its side walls 23 so that the pad 21 itself has a flat upper resilient portion 24 and a cylindrical resilient portion 25. This provides a gentle rest that can be held firmly against the edge 26 of a tooth 27 as shown in FIG. 4, thereby preventing chipping or fracture of the tooth when closing pressure is applied later. The tooth 27 in FIG. 4 has a dental onlay 28, which may be plastic, held to it by cement 29. The rear surface of the onlay 28 is shaped approximately like the front surface 30 of the tooth 27.

The jaw 15 of the pliers 10 is provided with an insert 31 of hard metal such as tungsten carbide. This insert 31 has an anchor portion 32 that is secured as by braising to a socket 33 and a forward portion 34 which projects downwardly and has a sharp lower edge 35 with a forward surface 36. This surface 36 may be flat or it may approximate the curve of the front surface 30 of the tooth 27.

In use, the jaws 14 and 15 are first spread apart somewhat, and the jaw 15 is placed below the tooth 27 with the pad 21 located so that its upper surface 24 firmly engages the tooth's edge 26. The resiliency of the pad 21 helps achieve this engagement. The upper jaw 15 is open wide enough so that the insert member 31 has its edge 35 slightly above the onlay 28. By urging the handles 16 and 17 toward each other, the edge 35 is then moved down to the top edge 37 of the onlay 28 and in between it and the surface 30 of the tooth, so that the edge 35 engages the cement 29. As the edge 35 continues to be moved down firmly, it cuts into the cement 29, which is a somewhat brittle material such as epoxy resin and forms a cleavage plane, and the edge 35 thus pries the onlay 28 from the tooth surface 30. The interface of the cement 29 with the tooth 27 is far less strong than the enamel on the surface of the tooth 27, and the cement 29 is of course far weaker than the tungsten carbide of the insert 31, and the downward movement of the edge 35 causes the onlay 28 to come off very rapidly and cleanly. The tool 10 directs the applied force specifically to the cleavage plane (i.e., the cement) and not at the enamel. Thousands of tests have been made using instruments embodying the principles of the invention, and there has never been any damage to the enamel. The line of least resistance is the cement-to-tooth interface, and so the separation takes place there.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A tool for removing an orthodontic onlay that has been cemented to the front surface of a tooth, comprising pliers having a pair of pivoted jaws and a pair of handles, a first said jaw terminating in a resilient pad, and a second said jaw terminating in a hard chisel portion with a sharp flat edge approximately the width of an onlay projecting toward said pad and resting against said pad when said jaws are closed together, whereby said pliers during use are positioned with said first jaw having its pad seated on the biting edge of said tooth and with said second jaw against the surface of said tooth and said sharp edge is moved toward said pad in between said onlay and said tooth to cleave said onlay from said tooth along the cement-tooth interface.

2. The tool of claim 1 having spring means anchored to said handles for spring loading said handles away from each other.

3. The tool of claim 1 wherein facing inner surfaces of said handles have posts projecting therefrom and a coil spring anchored at said posts and urging said handles apart from each other.

4. A tool for removing an orthodontic onlay that has been cemented to the front surface of a tooth, comprising pliers having a pair of pivoted jaws and a pair of handles, a first said jaw terminating in a resilient pad, and a second said jaw terminating in a hard chisel portion with a sharp edge that approximates the curve of the front surface of a tooth and is approximately the width of the onlay projecting toward said pad and resting against said pad when said jaws are closed together, whereby said pliers during use are positioned with said first jaw having its pad seated on the biting edge of said tooth and with said second jaw against the surface of said tooth and said sharp edge is moved toward said pad in between said onlay and said tooth to cleave said onlay from said tooth along the cement-tooth interface.

* * * * *